United States Patent
Anderson et al.

(10) Patent No.: US 9,300,402 B2
(45) Date of Patent: Mar. 29, 2016

(54) DISPERSION MANAGEMENT IN OPTICAL NETWORKS INCLUDING BOTH COHERENT AND DIRECT DETECTION RECEIVERS

(75) Inventors: William Anderson, Red Bank, NJ (US); Alexei N. Pilipetskii, Colts Neck, NJ (US)

(73) Assignee: TYCO ELECTRONICS SUBSEA COMMUNICATIONS LLC, Morristown, NJ (US)

( * ) Notice: Subject to any disclaimer, the term of this patent is extended or adjusted under 35 U.S.C. 154(b) by 0 days.

(21) Appl. No.: 13/325,215

(22) Filed: Dec. 14, 2011

(65) Prior Publication Data

US 2012/0148259 A1 Jun. 14, 2012

Related U.S. Application Data

(60) Provisional application No. 61/422,995, filed on Dec. 14, 2010.

(51) Int. Cl.
*H04B 10/12* (2006.01)
*H04B 10/2513* (2013.01)

(52) U.S. Cl.
CPC .... *H04B 10/25133* (2013.01); *H04B 2210/252* (2013.01)

(58) Field of Classification Search
CPC .... H04B 10/61; H04B 10/66; H04B 10/2507; H04B 10/2513; H04B 10/6161; H04B 10/25133; H04B 2210/252; H04B 10/07951; H04B 10/616; H04B 2210/003; H04B 10/25137; H04B 10/25253; H04B 10/60; H04B 10/63; H04B 10/64

USPC .......... 398/147, 148, 159, 81, 29, 202–204, 398/207, 208, 210, 211, 212, 214
See application file for complete search history.

(56) References Cited

U.S. PATENT DOCUMENTS

| 4,824,201 | A  | * | 4/1989 | Kazovsky ............... 398/185 |
| 6,597,669 | B1 |   | 7/2003 | Takahashi et al. |
| 7,333,732 | B2 |   | 2/2008 | Domagala |
| 7,426,323 | B2 |   | 9/2008 | Abbott et al. |
| 7,558,479 | B1 |   | 7/2009 | Robinson |
| 7,734,187 | B2 |   | 6/2010 | Pilipetskii et al. |
| 8,380,068 | B2 | * | 2/2013 | Chang et al. .......... 398/81 |
| 8,401,389 | B2 | * | 3/2013 | Vassilieva ............. 398/81 |

(Continued)

FOREIGN PATENT DOCUMENTS

| JP | 2006245706 | 9/2006 |
| JP | 2009153200 | 7/2009 |

(Continued)

OTHER PUBLICATIONS

International Search Report and Written Opinion mailed Mar. 6, 2012 in corresponding PCT Patent Application Serial No. PCT/US11/64796.

(Continued)

*Primary Examiner* — Hibret Woldekidan

(57) ABSTRACT

Dispersion may be managed in an optical network by allowing accumulation of dispersion to at least ten thousand ps/nm, and several tens of thousands of ps/nm in some embodiments. The accumulated dispersion may be returned to zero or near zero at a receiver and/or at one or more branch paths coupled to the transmission path.

10 Claims, 6 Drawing Sheets

(56) References Cited

U.S. PATENT DOCUMENTS

| | | | |
|---|---|---|---|
| 8,666,251 B2* | 3/2014 | Zhao et al. | 398/81 |
| 2004/0184812 A1* | 9/2004 | Michishita | 398/147 |
| 2006/0045533 A1* | 3/2006 | Pilipetskii et al. | 398/147 |
| 2006/0126999 A1* | 6/2006 | Feldman et al. | 385/24 |
| 2007/0183711 A1* | 8/2007 | Abbott et al. | 385/24 |
| 2009/0148164 A1* | 6/2009 | Roberts et al. | 398/65 |
| 2009/0208216 A1* | 8/2009 | Ellis et al. | 398/81 |
| 2010/0232809 A1 | 9/2010 | Cai et al. | |
| 2011/0058820 A1* | 3/2011 | Ooi | 398/147 |
| 2011/0097088 A1* | 4/2011 | Pelouch et al. | 398/81 |
| 2011/0222864 A1* | 9/2011 | Vassilieva | 398/158 |
| 2011/0268459 A1* | 11/2011 | Rollins et al. | 398/208 |
| 2011/0293287 A1* | 12/2011 | Fukuchi | 398/147 |

FOREIGN PATENT DOCUMENTS

| | | | | |
|---|---|---|---|---|
| WO | 2006017851 | | 2/2006 | |
| WO | WO2010090050 | * | 12/2010 | H04B 10/2513 |

OTHER PUBLICATIONS

Chinese Official Office Action dated May 6, 2015 in correspondence Chinese Patent Application No. 201180059893.1.

Vaa et al; "Dense WDM RZ-DPSK Transmission Over Transoceanic Distances Without Use of Periodic Dispersion Management;" 30th European Conference on Optical Communication; Stockholm, Sweden, Sep. 5-9, 2004.

Bakhshi et al; "First Dispersion-Flattened Transpacific Undersea System: From Design to Terabit/s Field Trial;" Journal of Lightwave Technology, vol. 22, No. 1, Jan. 2004; pp. 233-241.

Cai et al; "Transmission of 96 x 100-Gb/s Bandwidth-Constrained PDM-RZ-QPSK Channels with 300% Spectral Efficiency Over 10610 km and 400% Spectral Efficiency Over 4370 km;" Journal of Lightwave Technology, vol. 29, No. 4, Feb. 15, 2011; pp. 491-498.

Anderson et al; "Coherent Friendly Dispersion Map for Direct Detection Transmission Formats;" OFC/NFOEC Technical Digest, 2012 OSA.

* cited by examiner ent application Ser. No. 61/422,995 filed Dec. 14,

DISPERSION MANAGEMENT IN OPTICAL NETWORKS INCLUDING BOTH COHERENT AND DIRECT DETECTION RECEIVERS

CROSS-REFERENCE TO RELATED APPLICATIONS

This application claims the benefit of the filing date of U.S. Provisional Application Ser. No. 61/422,995 filed Dec. 14, 2010, the teachings of which are hereby incorporated herein by reference.

TECHNICAL FIELD

The present disclosure relates to optical networks and more particularly, to dispersion management in optical networks including both coherent and direct detection receivers.

BACKGROUND

Direct detection optical signal receivers have been used in optical networks for recreating data modulated on an optical signal and transmitted on an optical path to the receiver. In general, a direct detection receiver may demodulate the data by detecting the phase and/or amplitude of received symbols representative of the transmitted data. The detected phase and/or amplitude may be provided to hard and/or soft decision detector configurations and forward error correction (FEC) circuits to generate an output bit stream that is representative of the data modulated on the signal at the transmitter.

One challenge in wavelength-division multiplexed (WDM) optical networks including direct detection receivers is that light propagating within an optical fiber may undergo chromatic dispersion, i.e. different wavelengths of the light may travel at different group velocities leading to varying wavelength-dependent delays in transmission. The chromatic dispersion imparted by an optical fiber causes the transmitted pulses to spread and overlap. To reliably detect the transmitted data, the chromatic dispersion should be removed before the receiver. Removing the dispersion imparted by the transmission line may, however, be impractical when the dispersion is larger than a few 1000's of ps/nm.

To address this issue, known systems have incorporated dispersion management techniques to reduce the dispersion at the receiver to practical levels. One known dispersion management technique involves dispersion mapping where optical fiber types are selected and arranged to manage the dispersion in the transmission segments of an optical communication system. One example of a dispersion mapped transmission segment mixes spans of non-zero dispersion-shifted fiber (NZDSF) or spans of dispersion flattened fiber (DFF) having a non-zero dispersion with spans of dispersion compensation fiber (DCF) to realize periodic dispersion compensation over the length of the optical transmission segment. The length of each period in such periodic dispersion maps may be in the range of about 500 km per period.

FIG. 1, for example, includes a plot 10 of accumulated dispersion (ps/nm) vs. distance associated with such a periodic dispersion map using DFF fibers. As shown, dispersion may be near zero at the receiver, i.e. at about 8500 km, and non-zero but small (e.g. a maximum accumulated dispersion of about 1500 ps/nm) along the system. For conventional systems using direct detection, such dispersion mapping techniques have been useful in maintaining a low end-to-end path average dispersion and suppressing fiber nonlinearities.

It has been recognized however, that coherent detection receivers may provide advantages over direct detection receivers. In general, a coherent receiver utilizes coherent detection, e.g. homodyne or heterodyne detection, to detect modulated optical signals. The term "coherent" when used herein in relation to a receiver refers to a receiver including a local oscillator (LO) for demodulating the received signal. Digital signal processing (DSP) may be implemented in such systems for processing the received signals to provide demodulated data. Digital signal processing of the received signal provides speed and flexibility, and may be used to perform a variety of functions. DSP can remove large amounts of chromatic dispersion, and can perform other functions such as correction of intersymbol interference and polarization dispersion. Thus, unlike direct detection receivers, coherent detection receivers do not require dispersion management. Unfortunately, systems built to support both direct detection and coherent detection receiver configurations must be dispersion managed to allow use of practical direct detection receiver configurations.

BRIEF DESCRIPTION OF THE DRAWINGS

Features and advantages of a system consistent with the present disclosure will be better understood by reading the following detailed description, taken together with the drawings wherein.

DETAILED DESCRIPTION

In general, in the experiments leading to the systems and methods consistent with the present disclosure, it was discovered that optical networks using coherent receivers do not require dispersion compensation on the optical path. Instead, in coherent detection systems accumulation of large amounts of dispersion on the fiber path may be somewhat advantageous since its effects can be removed in the DSP at the receiver. This is in stark contrast to direct detection systems, which generally require dispersion management to achieve acceptable performance.

This difference can create challenges in construction of systems that currently use direct detection receivers, but may be upgraded in the future to use coherent detection receivers, and in systems that will use mixtures of direct detection and coherent detection receivers. A system and method consistent with the present disclosure, however, resolves these problems by providing dispersion management in an optical network that facilitates use of both direct detection and coherent detection receivers.

Figure 1:
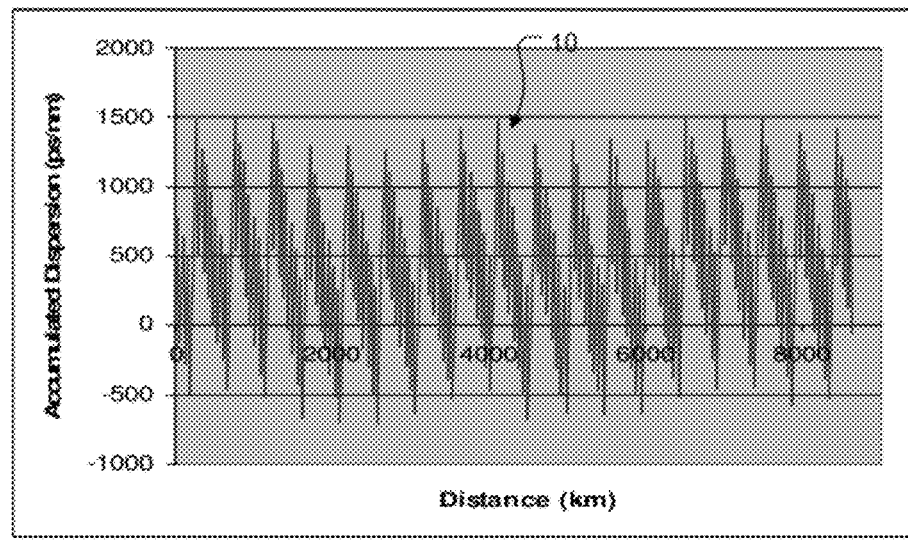
FIG. 1 is a dispersion map showing accumulated dispersion vs. distance consistent with one embodiment of a prior art system.

In general, in a system and method consistent with the present disclosure, large amounts of dispersion may be allowed to accumulate on the transmission path for each of a plurality of wavelengths of a WDM signal before compensation. The dispersion in a system consistent with the present disclosure may achieve a maximum accumulated dispersion of at least 10,000 ps/nm (picoseconds/nanometer), and as much as 100,000 or more ps/nm in some embodiments, and may be corrected to near zero at the receiver or a branch path. As used herein "near zero" refers to a dispersion of less than 5000 ps/nm. It has been discovered that such a dispersion management scheme allows for high transmission performance for both direct detection and coherent detection receivers, with reduced system complexity, without significant loss in system performance for direct detection compared to dispersion management as practiced in the prior art, as shown in FIG. 1.

Figure 2:
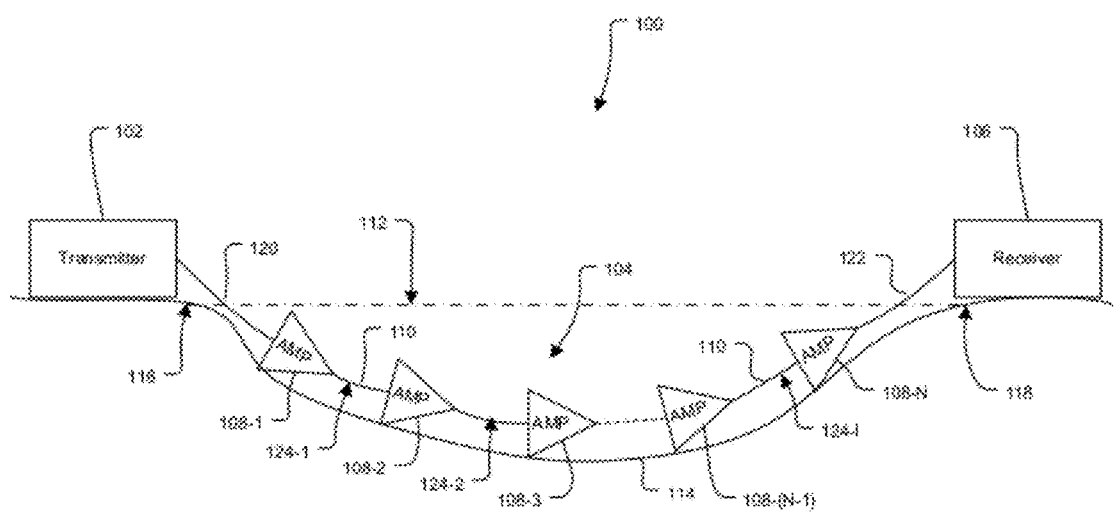
FIG. 2 is a schematic diagram of an optical communication system, consistent with one embodiment of the present disclosure.

Turning now to FIG. 2, there is illustrated an exemplary optical communication system 100 consistent with the present disclosure. Those of ordinary skill in the art will recognize that the system 100 has been depicted as a highly simplified point-to-point system for ease of explanation. It is to be understood that a dispersion management scheme present disclosure may be incorporated into a wide variety of optical networks and systems.

The illustrated exemplary optical communication system 100 includes a transmitter 102 and a receiver 106 connected via an optical transmission path 104. The system may be a WDM transmission system with data modulated on each of a plurality of wavelengths at the transmitter 102, e.g. using a differential phase shift keying (DPSK) modulation format, for transmission over the optical information channel 104. The receiver 106 may include direct detection and/or coherent detection receivers. One example of a direct detection receiver is described in U.S. Pat. No. 7,333,732 and one example of a coherent detection receiver is described in U.S. Patent Publication No. US 2010/0232809, the teachings of which patent and patent application are hereby incorporated herein by reference. Although the system 100 is illustrated as including a distinct transmitter 102 and receiver 106, those of ordinary skill in the art will recognize the transmitter 102 and receiver 106 may each be configured as a transceiver to facilitate bi-directional communication over the optical information channel.

Depending on system characteristics and requirements, the optical transmission path 104 may include an optical transmission fiber 110, optical amplifiers/repeaters 108-1, 108-2, 108-3, 108-(N−1), 108-N, optical filters, and other active and passive components. A variety of configurations for each of these elements will be known to those skilled in the art. For clarity, only optical amplifiers/repeaters 108-1, 108-2, 108-3, 108-(N−1), 108-N and optical transmission fiber 110 are illustrated in the optical information channel 104.

The system 100 may be employed to span a body of water 112. When used to span a body of water, e.g. an ocean, amplifiers/repeaters 108-1, 108-2, 108-3, 108-(N−1), 108-N may be seated on the ocean floor 114 and the transmission path 104 may span between beach landings 116, 118 to extend from the water 112 for coupling to the transmitter 102 and receiver 106. It will be appreciated that a plurality of optical transmission components may be coupled to the transmission path 104 and may be disposed beneath water and/or over land.

In general, the distance between optical amplifiers defines a transmission span length. For example, a system configured to span a body of water will include at least first 120 and second 122 shore spans. In the illustrated exemplary embodiment, a first shore span 120 extends between the transmitter 102 and the first amplifier/repeater 108-1 and a second shore span 122 extends from the final amplifier/receiver 108-N to the receiver 106. Those of ordinary skill in the art will recognize that span lengths may vary significantly in a particular system. In a long-haul system, for example, some spans may be as short as 20 kilometers, while the average span may be about 50 kilometers to about 100 kilometers or more depending on system characteristics and requirements. In view of the span length variation, signal attenuation and dispersion vary from span-to-span.

Figure 3:
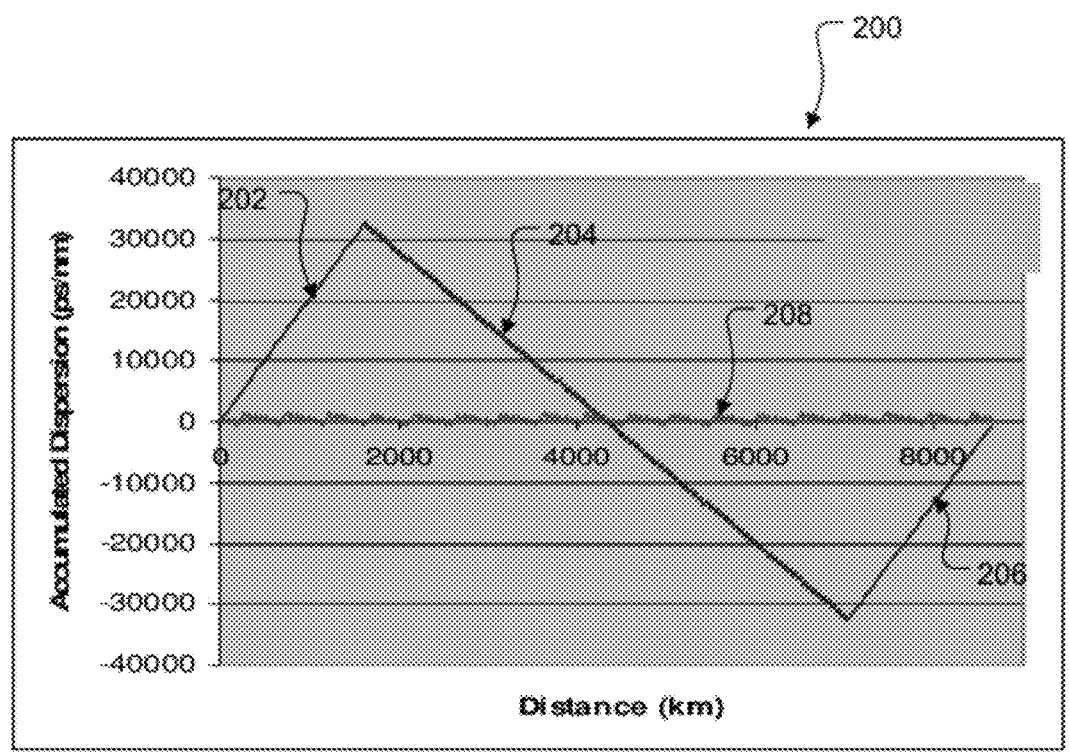
FIG. 3 is a dispersion map showing accumulated dispersion vs. distance consistent with one embodiment of the present disclosure.

In a system consistent with the present disclosure, data may be modulated on a plurality of wavelengths in a WDM system, and dispersion management may be accomplished according to a dispersion map that allows accumulation of dispersion to at least 10,000 picoseconds/nanometer (ps/nm), and at least 20,000 ps/nm in some embodiments, for all wavelengths in the system bandwidth. Turning to FIG. 3, for example, there is illustrated an exemplary dispersion map, represented by plot 200, for an exemplary system 100 consistent with the invention wherein the shore spans 120, 122 and spans adjacent thereto include a positive dispersion fiber such as SLAF fiber (super large area fiber) and the spans in the middle of the path, e.g. from about 2000 km to 7000 km, are constructed from a negative dispersion fiber such as a IDF (inverse dispersion fiber), HDF (high dispersion fiber), or some combination of fibers with positive and negative dispersion. Those of ordinary skill in the art will recognize that transmission fibers may be dispersion-flattened fibers (DFF) which generally impart an essentially uniform accumulated dispersion across a band of wavelengths, or they may be conventional fibers, which permit dispersion to vary across a band of wavelengths.

The plot 200 has several portions 202, 204, 206. The first portion 202 indicates a positive dispersion compensation by positive dispersion fiber of the shore span 120 and spans adjacent thereto to achieve an accumulated dispersion greater than 30,000 ps/nm. The second portion 204 of the plot indicates accumulation of negative dispersion over spans in the middle of the path (from about 2000 km from the transmitter to about 7000 km) to more negative than −30,000 ps/nm. The third portion 206 of the plot 200 indicates positive dispersion compensation by positive dispersion fiber of the shore span 122 and spans adjacent thereto to return the accumulated dispersion back to a zero or near zero dispersion level for the minimum dispersion wavelength ($\lambda_0$). The minimum dispersion wavelength $\lambda_0$ may be inside or outside of the signal bandwidth in section 206. For comparison, FIG. 3 also includes a plot 208 of dispersion associated with one embodiment of a conventional system configured for use with a direct detection receiver only. As shown, the dispersion accumulation in a system consistent with the present disclosure may be an order of magnitude greater than the dispersion accumulation associated with a system designed for use of direct detection receiver only.

Figure 4:
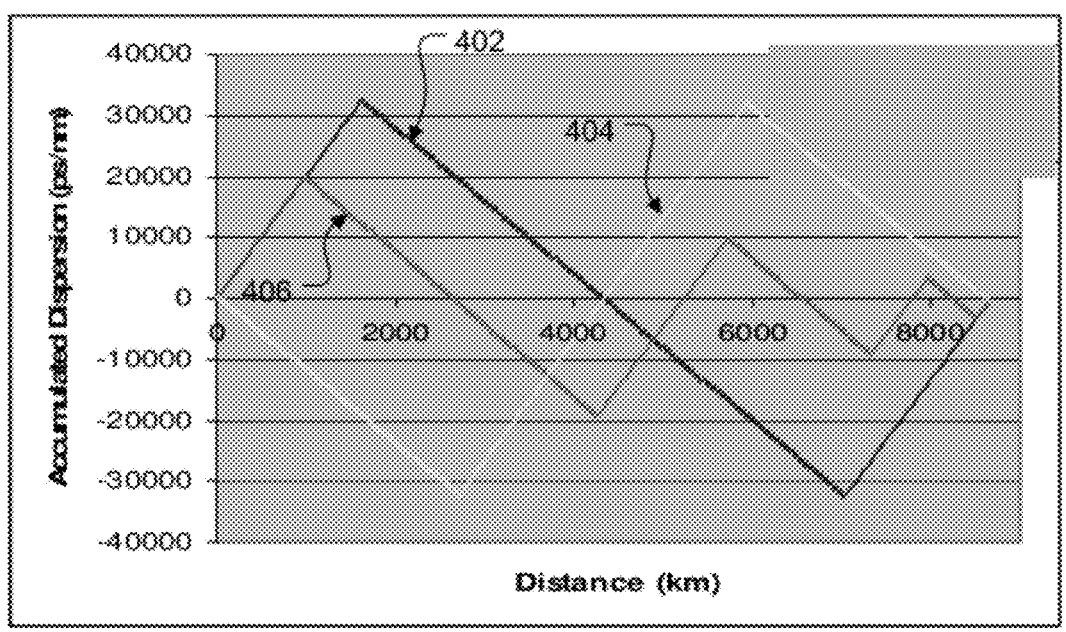
FIG. 4 is a dispersion map showing accumulated dispersion vs. distance consistent with three different embodiments of the present disclosure.

The dispersion accumulation for optimizing performance of a particular system may vary depending on system characteristics and requirements. In general, however, a system and method consistent with the present disclosure allows accumulation of dispersion to at least 10,000 ps/nm before compensation. FIG. 4, for example, illustrates three different examples of dispersion maps 402, 404, 406 consistent with the present disclosure that provide good performance for both coherent and direct detection systems. Dispersion map 402 is similar to the map illustrated in FIG. 3. Dispersion map 404 is inversely configured compared to dispersion map 402, i.e. negative dispersion is accumulated at and adjacent the shore spans 120, 122 and positive dispersion is accumulated in the middle of the transmission path. Dispersion map 406 involves more-frequent compensation than shown in maps 402 and 404 but still allows accumulation of dispersion to about 20,000 ps/nm.

Figure 5A:
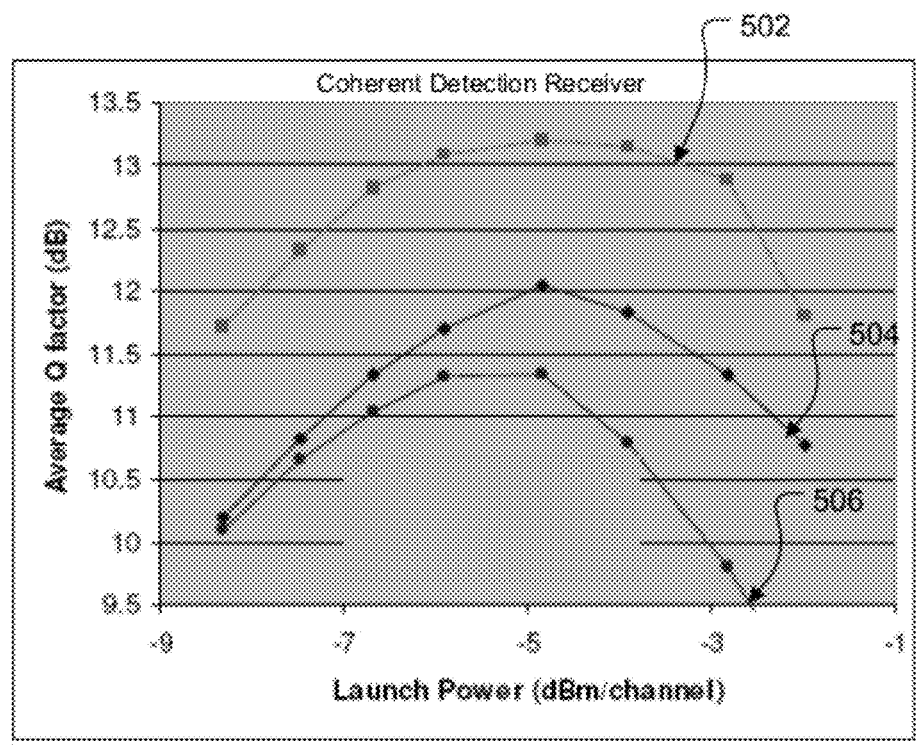
FIGS. 5A and 5B include plots of average Q-factor vs. launch power illustrating performance of system consistent with the present disclosure in connection with coherent and direct detection receivers, respectively.
Figure 5B:
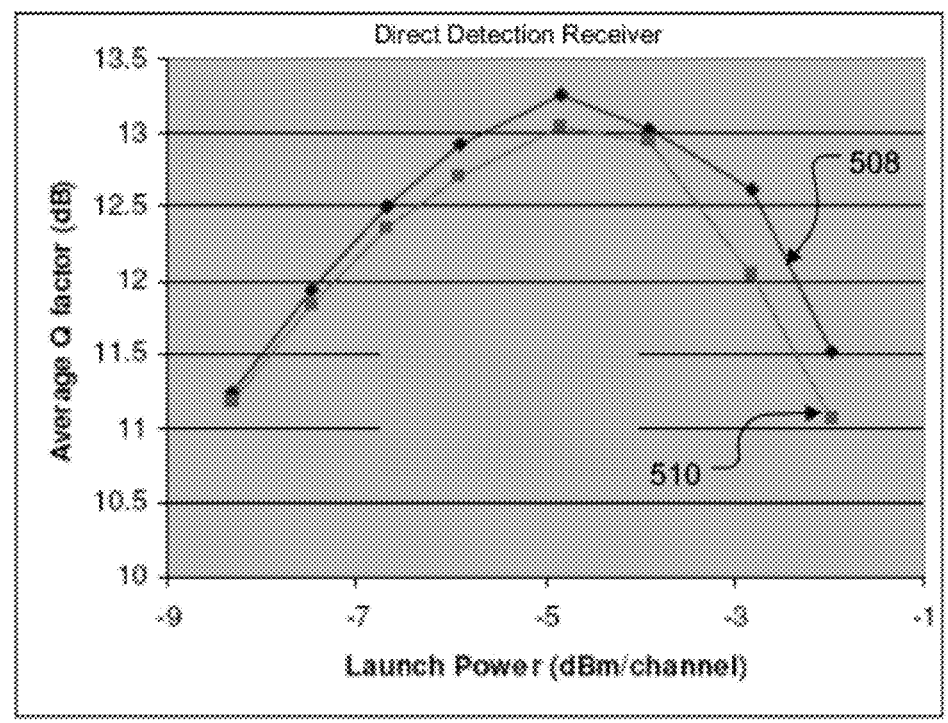

FIGS. 5A and 5B include plots of Q-factor vs. launch power (from the transmitter) illustrating performance of a system consistent with the present disclosure when used in connection with coherent detection and direct detection receivers, respectively. In particular, FIG. 5A includes plots 502, 504, 506 illustrating Q-factor performance vs. launch power using a coherent detection receiver with an uncompensated system (i.e. no dispersion compensation), a system including dispersion compensation consistent with the present disclosure, and a system designed with a flat map for use with a direct detection receiver only (e.g. similar to plot 208 in FIG. 3), respectively. FIG. 5B includes plots 508, 510 illustrating Q-factor performance vs. launch power using a direct detection receiver with, a system including dispersion compensation consistent with the present disclosure, and a system designed with a flat map for use with a direct detection receiver only (e.g. similar to plot 208 in FIG. 3), respectively.

As shown in FIG. 5B, a system including dispersion compensation consistent with the present disclosure (plot 508) performs as well or better than the prior art flat dispersion map (plot 510) for a direct detection receiver. For a coherent detection system, a shown in FIG. 5A, a system including dispersion compensation consistent with the present disclosure (plot 504) performs better than the prior art flat dispersion map system (plot 506), but not as well as an uncompensated system (plot 502). Performance in a coherent detection system is thus best when no dispersion compensation is provided in the transmission path, but in a system that may include coherent and/or direct detection performance is best for both systems when dispersion is compensated in a manner consistent with the present disclosure.

Figure 6A:
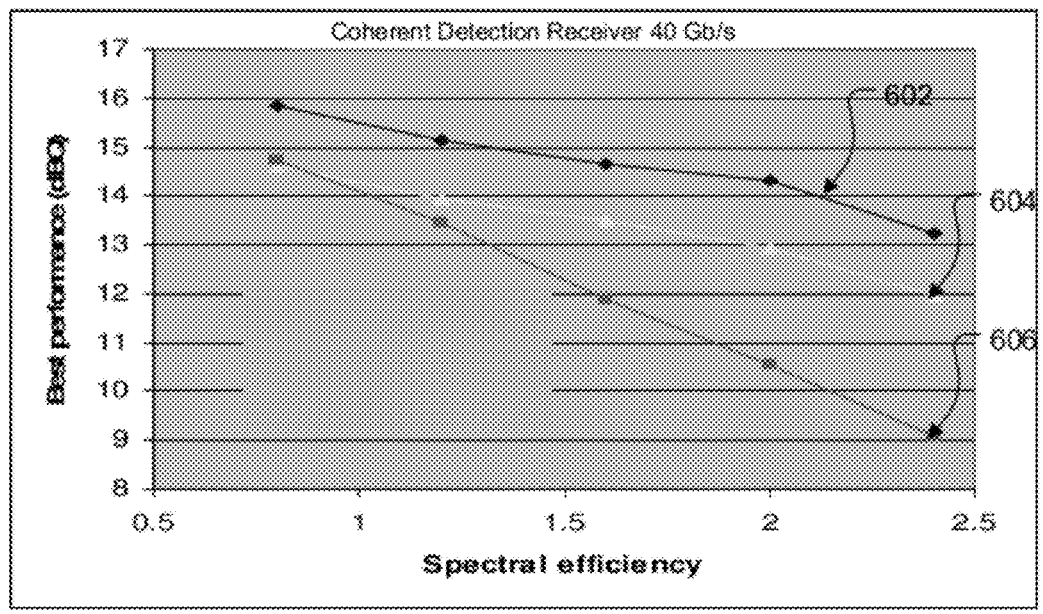
FIGS. 6A and 6B include plots of Q-factor vs. spectral efficiency illustrating performance of system consistent with the present disclosure in connection with a coherent receiver and at 40 Gb/s and 100 Gb/s data rates, respectively.
Figure 6B:
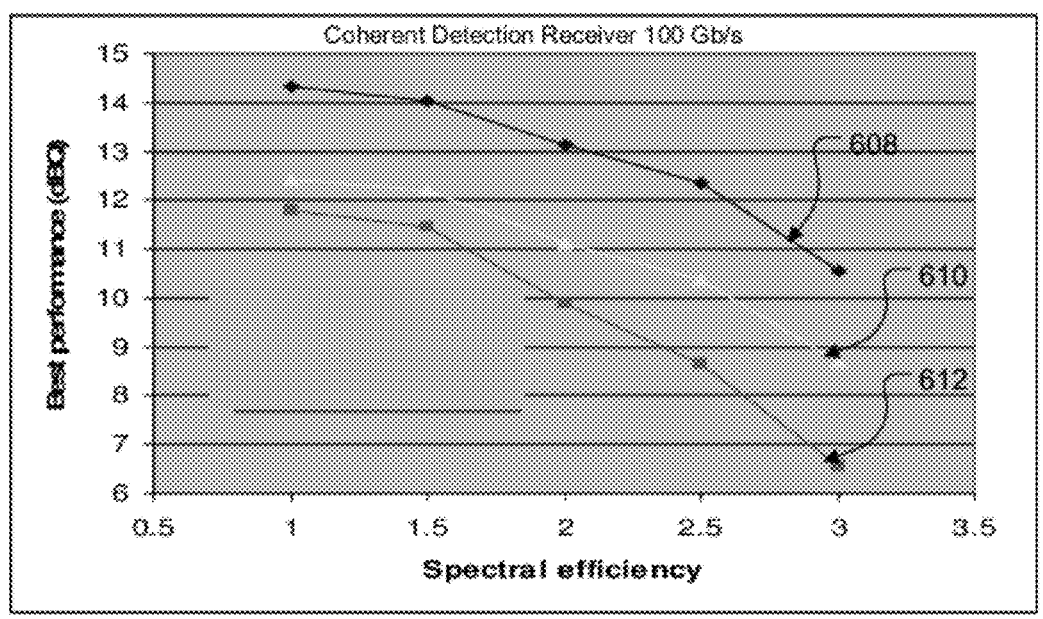

In addition, as spectral efficiency increases in a system consistent with the present disclosure (i.e. when the transmitted wavelengths are more closely spaced) the performance advantages of a system consistent with the present disclosures are increased. FIGS. 6A and 6B include plots of Q-factor (dbQ) vs. spectral efficiency illustrating performance of a system consistent with the present disclosure when used in connection with coherent detection in 40 Gb/s and 100 Gb/s systems, respectively. In particular FIG. 6A includes plots 602, 604, 606 illustrating Q-factor performance vs. spectral efficiency using a 40 Gb/s coherent detection receiver with an uncompensated system (i.e. no dispersion compensation), a system including dispersion compensation consistent with the present disclosure, and a system designed with a flat map for use with a direct detection receiver only (e.g. similar to plot 208 in FIG. 3), respectively. FIG. 6B includes plots 608, 610, 612 illustrating Q-factor performance vs. spectral efficiency using a 100 Gb/s coherent detection receiver with an uncompensated system (i.e. no dispersion compensation), a system including dispersion compensation consistent with the present disclosure, and a system designed with a flat map for use with a direct detection receiver only (e.g. similar to plot 208 in FIG. 3), respectively. As shown, a system including dispersion compensation consistent with the present disclosure (plots 604, 610) performs increasingly better compared to a prior art flat dispersion map (plots 606, 612) with increasing spectral efficiency for both 40 Gb/s and 100 Gb/s systems.

A system consistent with the present disclosure is also useful in connection with branched optical networks. In general, a branched optical network may include one or more branching units situated along a trunk path. Each branching unit (BU) may be connected to a branch path (e.g., optical fiber) that terminates in a transmitting and/or receiving branch terminal. Each BU may include one or more optical add/drop multiplexers (OADM). Channels or wavelengths may be added to and/or dropped from the trunk path of the optical transmission system via the OADMs to direct optical signals on selected channels from and to the branch terminals.

Figure 7:
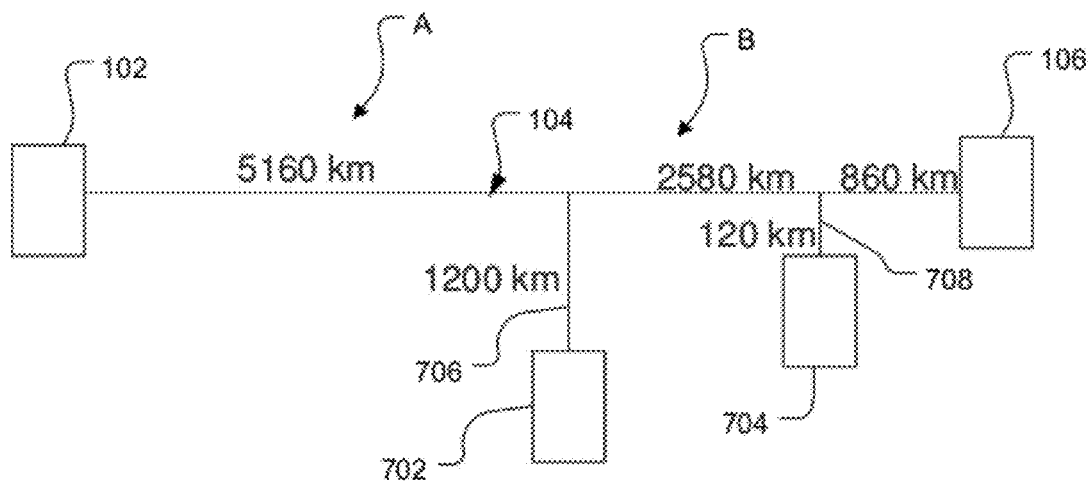
FIG. 7 is a schematic diagram of a branched optical communication system, consistent with one embodiment of the present disclosure.

In one embodiment of a branched optical network consistent with the present disclosure, large amounts of dispersion may be allowed to accumulate over the transmission path between the branch paths, but the dispersion may be corrected to near zero at each branch path. FIG. 7, for example, illustrates an exemplary branched optical network consistent with the present disclosure including a transmitter 102 and receiver 106 coupled by an optical information channel 104 (repeaters and other elements of the information channel have been omitted for clarity), and first 702 and second branch terminals 704 coupled to the information channel 104 by associated branch paths 706, 708. The illustrated embodiment shows exemplary distances between the transmitter 102, receiver 106 and branch paths 706, 708. It is to be understood, however, that these specific distances are provided by way of example and ease of explanation only, and that a system consistent with the present disclosure may be incorporated into a branch network having a wide variety of configurations and distances between system elements.

Figure 8:
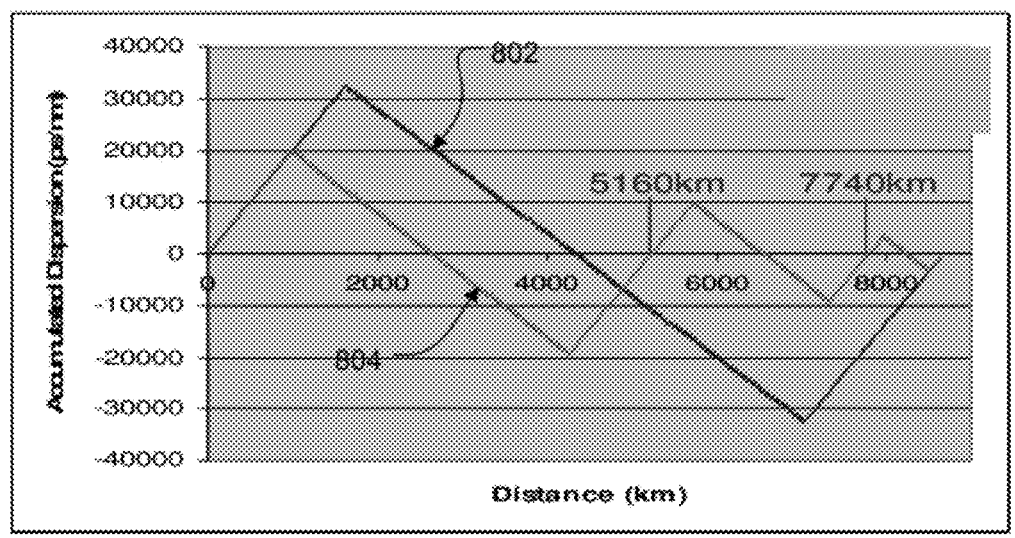
FIG. 8 is an exemplary dispersion map showing accumulated dispersion vs. distance for the system shown in FIG. 7.

Consistent with the present disclosure, the illustrated 8600 km optical information channel 104 from the transmitter 102 to the receiver 106 may be treated as three different segments, each of which may include dispersion compensation consistent with the present disclosure, i.e. large amounts of accumulated dispersion may be provided in each segment compared to prior art flat map approaches designed for use only with direct detection. FIG. 8 for example includes plots of accumulated dispersion vs. distance illustrating a dispersion map 802 consistent with the present disclosure associated with a point-to-point system (similar to the map shown in FIG. 3) and a dispersion map 804 consistent with the present disclosure for use in the branched network shown in FIG. 7. As shown, the map consistent with the present disclosure for use in a branched network allows large dispersion accumulation between the branch paths 706, 708 (i.e. at 5160 km and 7740 km), but returns the dispersion to near zero at the branch paths. In particular, in segment A of the path 104 shown in FIG. 7, dispersion accumulates to about 20,000 ps/nm, but returns to near zero at the location where the branch path 706 is coupled to the path 104 (i.e. at 5160 km from the transmitter), in segment B of the path 104, dispersion accumulates to about 10,000 ps/nm and is returned to near zero at the location where the branch path 708 is coupled to the path 104 (i.e. 7740 km from the transmitter).

Figure 9:
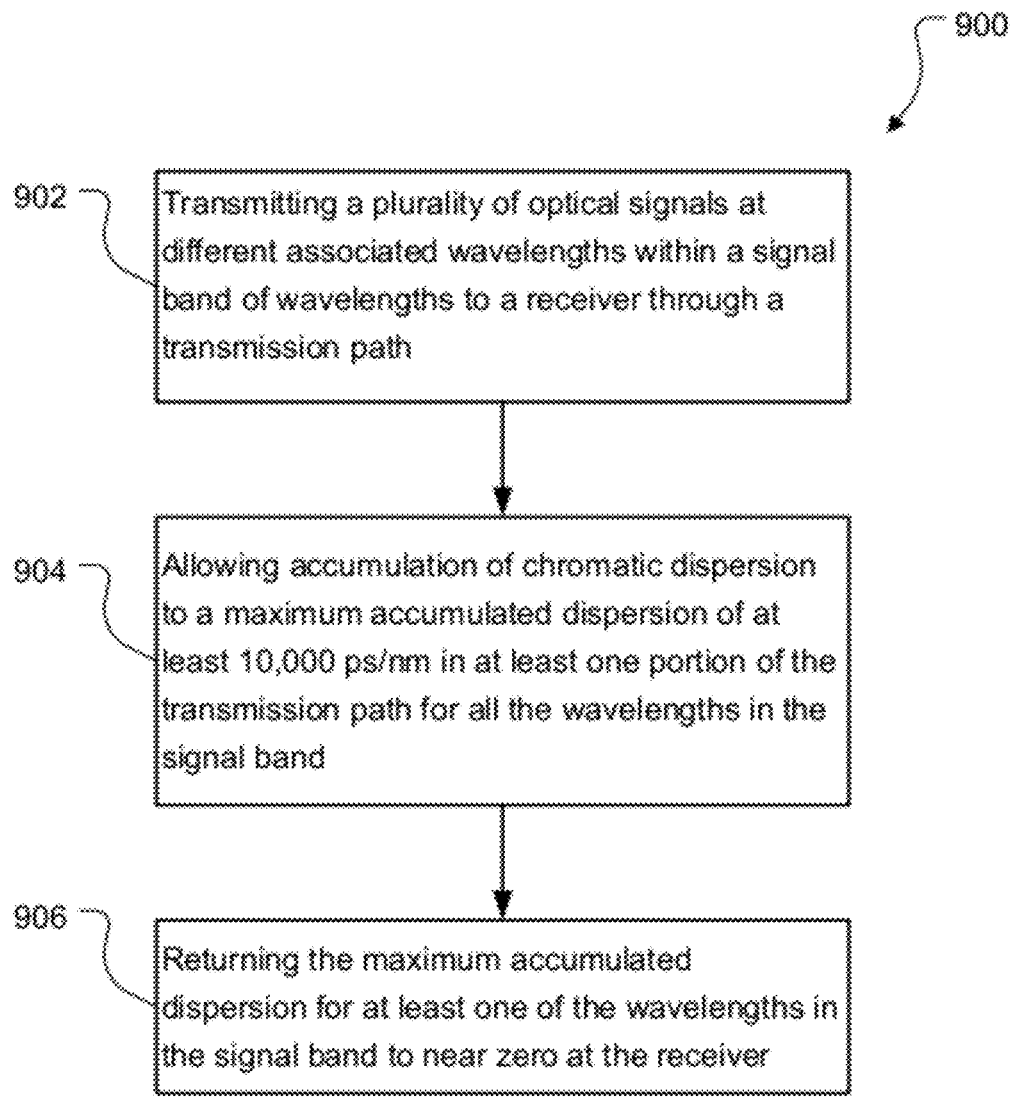
FIG. 9 is a block flow diagram of one method of managing dispersion in an optical communication system consistent with the present disclosure.

FIG. 9 is a block flow diagram of one method 900 for a method of managing dispersion in an optical communication system consistent with the present disclosure. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

In the exemplary embodiment illustrated in FIG. 9, a plurality of optical signals at different associated wavelengths within a signal band of wavelengths is transmitted 902 to a receiver through a transmission path. Chromatic dispersion is allowed to accumulate 904 to a maximum accumulated dispersion of at least 10,000 ps/nm in at least one portion of the transmission path for all the wavelengths in the signal band. The maximum accumulated dispersion for at least one of the wavelengths in the signal band is returned 906 to near zero at the receiver.

A system and method consistent with the present disclosure, therefore, includes providing a dispersion map for an optical network that facilitates use of both direct detection and coherent detection receivers with high transmission performance. In general, dispersion is accumulated to an amount much greater than that of prior art maps designed for known direct detection systems. In one embodiment, for example, dispersion in a system consistent with the present disclosure may be allowed to accumulate to at least 10,000 ps/nm, and to several tens of thousands of ps/nm in some embodiments, before it is corrected to near zero at a receiver or branch path. Such a dispersion map provides good performance for coherent detection due to the large dispersion accumulation but does not significantly impact performance for direct detection as long as dispersion is returned to near zero at the receiver.

Advantageously, therefore, a system useful in connection with both direct detection and coherent detection may be constructed consistent with the present disclosure without significant loss in nonlinear performance. Also, the system may be constructed using high dispersion spans and/or constituent fibers allowing for ease of repair and manufacture. Moreover, no pre-compensation (in the transmitting terminal) for dispersion is required in a system consistent with the present disclosure, which allows simplification of the terminal design and lower cost without loss of performance compared to prior art systems designed for use with only direct detection receivers.

According to one aspect of the disclosure, there is thus provided an optical communication system including: a transmitter configured to transmit a plurality of optical signals at different associated wavelengths within a signal band of wavelengths; a receiver configured to receive the plurality of optical signals; and a transmission path extending between the transmitter and the receiver. The transmission path is configured to cause accumulation of dispersion to a maximum accumulated dispersion of at least 10,000 ps/nm in at least one portion of the transmission path for all the wavelengths in the signal band, and to return the maximum accumulated dispersion for at least one of the wavelengths in the signal band to near zero at the receiver.

According to another aspect of the disclosure there is provided a method of managing dispersion in an optical communication system, the method including: transmitting a plurality of optical signals at different associated wavelengths within a signal band of wavelengths to a receiver through a transmission path; allowing accumulation of chromatic dispersion to a maximum accumulated dispersion of at least 10,000 ps/nm in at least one portion of the transmission path for all the wavelengths in the signal band; and returning the maximum accumulated dispersion for at least one of the wavelengths in the signal band to near zero at the receiver.

While the principles of the invention have been described herein, it is to be understood by those skilled in the art that this description is made only by way of example and not as a limitation as to the scope of the invention. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical communication system comprising:
   a transmitter configured to transmit a plurality of optical signals at different associated wavelengths within a signal band of wavelengths;
   a receiver configured to receive said plurality of optical signals, said receiver comprising at least one coherent detection receiver and at least one direct detection receiver; and
   a transmission path extending between said transmitter and said receiver for coupling at least a first one of said optical signals from said transmitter to said at least one coherent detection receiver and at least a second one of said optical signals from said transmitter to said direct detection receiver, said transmission path configured to cause accumulation of dispersion to a maximum accumulated dispersion of at least 10,000 ps/nm in at least one portion of said transmission path for each of said wavelengths in said signal band, and to compensate for said maximum dispersion for each of said wavelengths in said signal band to return said maximum accumulated dispersion for at least one of said wavelengths in said signal band to near zero at said receiver,
   whereby said at least a first one of said optical signals coupled from said transmitter to said at least one coherent detection receiver has said maximum accumulated dispersion of at least 10,000 ps/nm and said at least a second one of said optical signals coupled from said transmitter to said direct detection receiver has said maximum accumulated dispersion of at least 10,000 ps/nm.

2. An optical communication system according to claim 1, wherein said maximum accumulated dispersion is at least 20,000 ps/nm.

3. An optical communication system according to claim 1, wherein said maximum accumulated dispersion is greater than 30,000 ps/nm.

4. An optical communication system according to claim 1, said system further comprising at least one branch path coupled between said transmission path and a branch terminal, and wherein said transmission path is further configured to return said maximum accumulated dispersion for said at least one of said wavelengths in said signal band to near zero at a location where said branch path is coupled to said transmission path.

5. An optical communication system according to claim 1, said system further comprising a plurality of branch paths, each of said branch paths being coupled between said transmission path and a separate associated branch terminal, and wherein said transmission path is further configured to return said maximum accumulated dispersion for said at least one of said wavelengths in said signal band to near zero at each location where one of said branch paths is coupled to said transmission path.

6. A method of managing dispersion in an optical communication system, said method comprising:

transmitting a plurality of optical signals at different associated wavelengths within a signal band of wavelengths from a transmitter to a receiver through a transmission path, said receiver comprising at least one coherent detection receiver and at least one direct detection receiver, said transmission path coupling at least a first one of said optical signals from said transmitter to said at least one coherent detection receiver and at least a second one of said optical signals from said transmitter to said direct detection receiver;

accumulating chromatic dispersion to a maximum accumulated dispersion of at least 10,000 ps/nm in at least one portion of said transmission path for each of said wavelengths in said signal band, including said at least a first one of said optical signals coupled from said transmitter to said at least one coherent detection receiver and said at least a second one of said optical signals coupled from said transmitter to said direct detection receiver; and compensating for said maximum accumulated dispersion for each of said wavelengths in said signal band to return said maximum accumulated dispersion for at least one of said wavelengths in said signal band to near zero at said receiver.

7. A method according to claim 6, wherein said maximum accumulated dispersion is at least 20,000 ps/nm.

8. A method according to claim 6, wherein said maximum accumulated dispersion is greater than 30,000 ps/nm.

9. A method according to claim 6, said method further comprising returning said maximum accumulated dispersion for said at least one of said wavelengths in said signal band to near zero at a location where a branch path is coupled to said transmission path.

10. A method according to claim 6, said method further comprising returning said maximum accumulated dispersion for said at least one of said wavelengths in said signal band to near zero at each of a plurality of locations where associated branch paths are coupled to said transmission path.

* * * * *